United States Patent Office 3,278,052
Patented Oct. 11, 1966

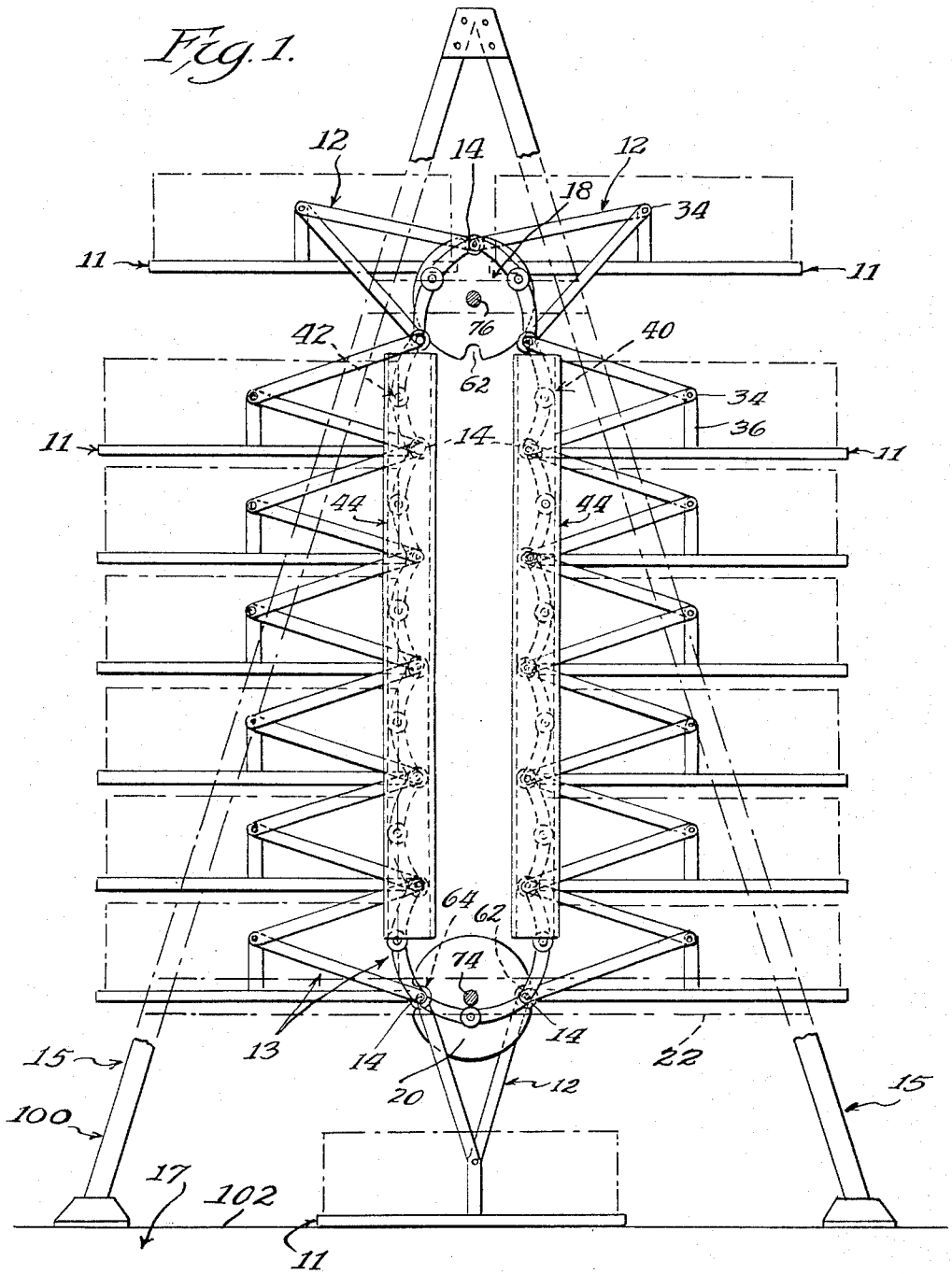

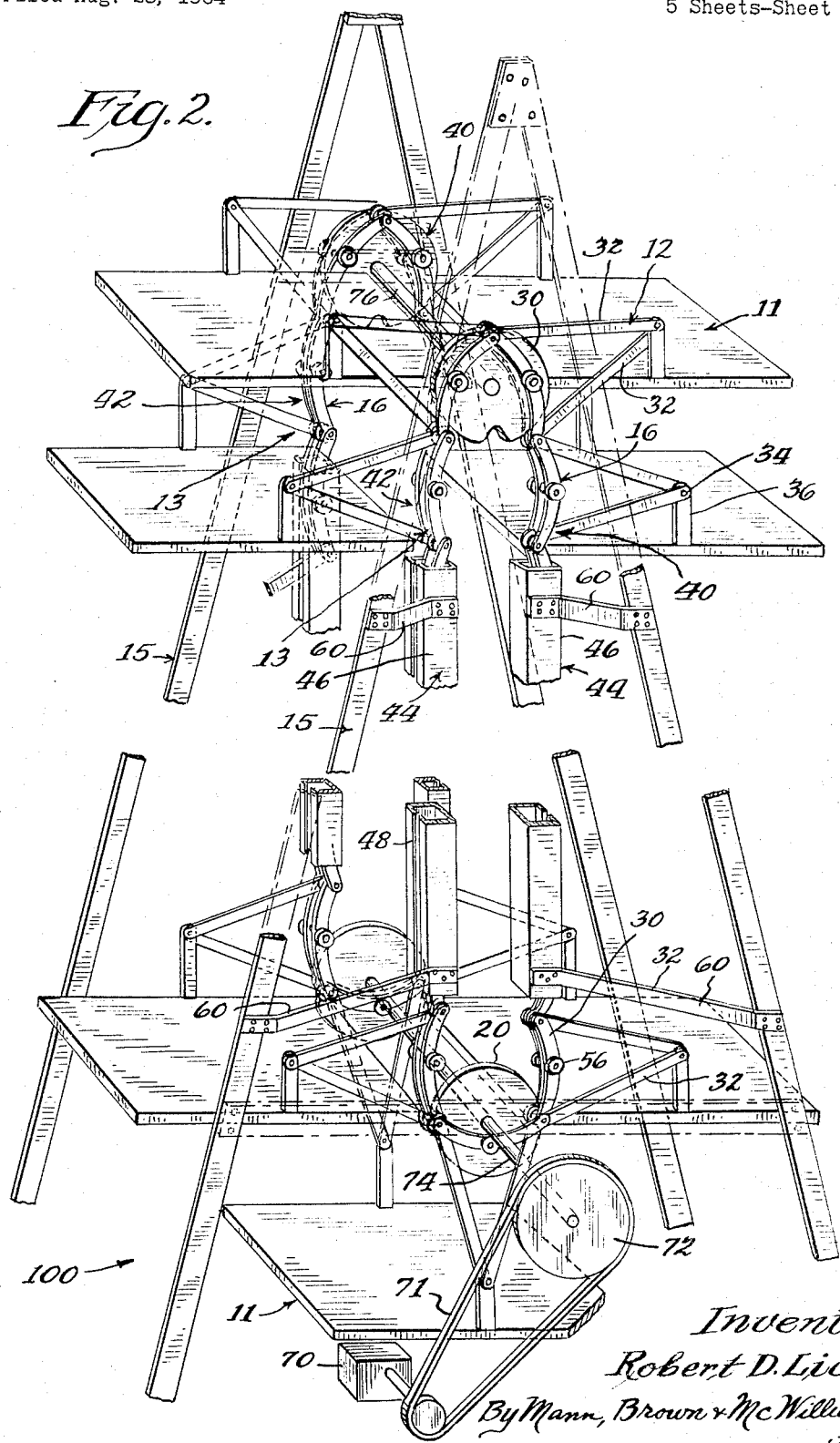

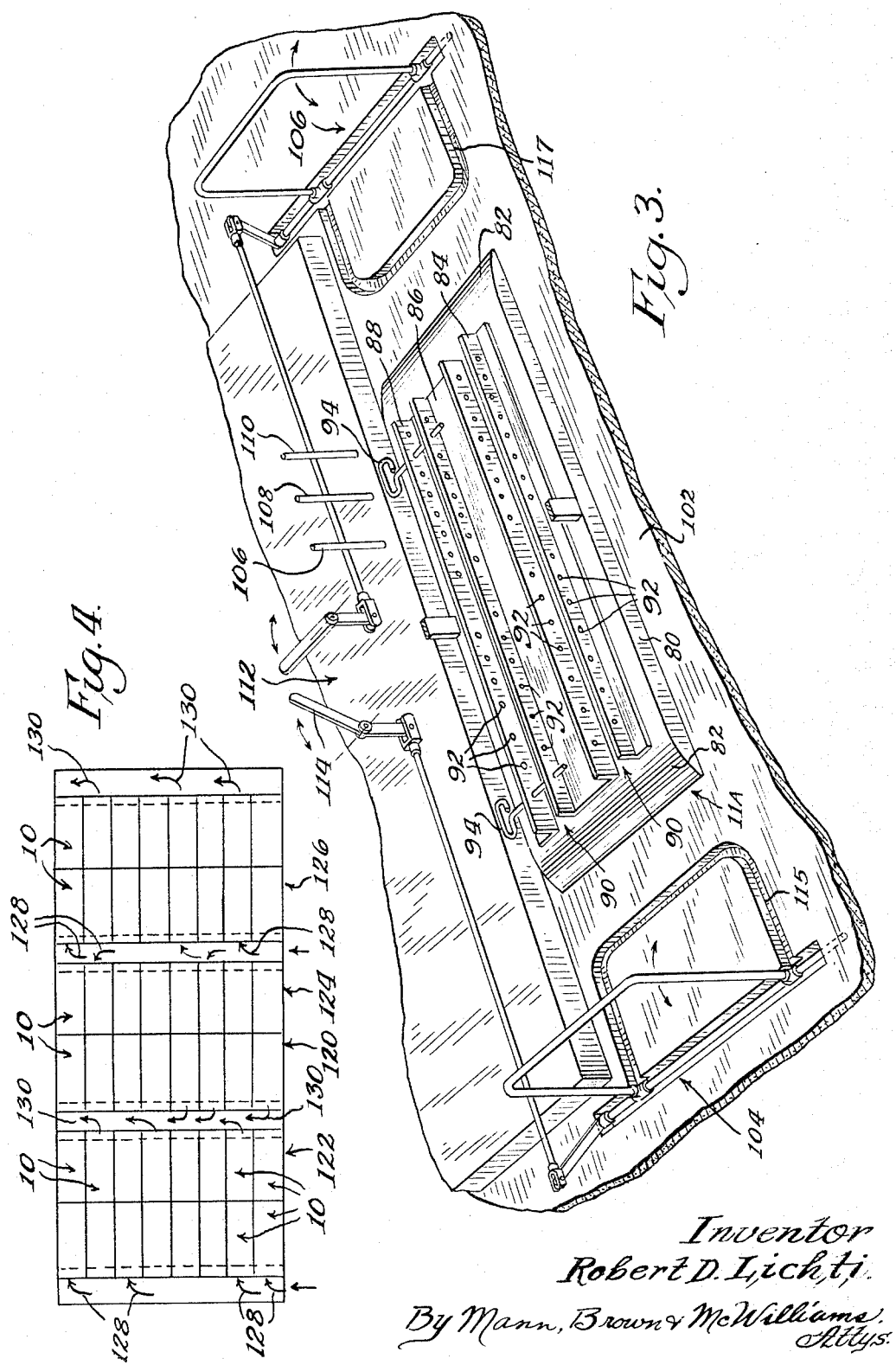

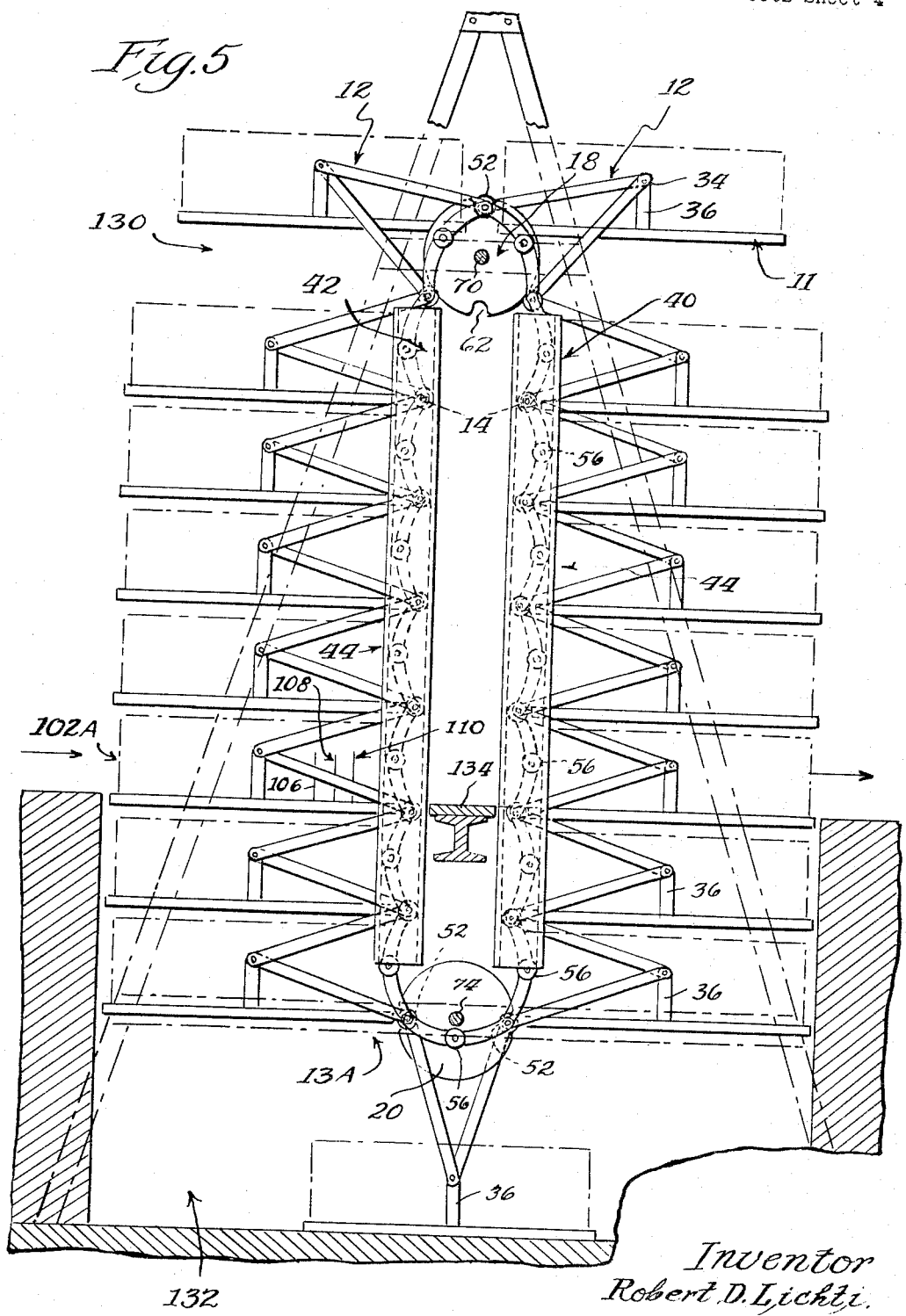

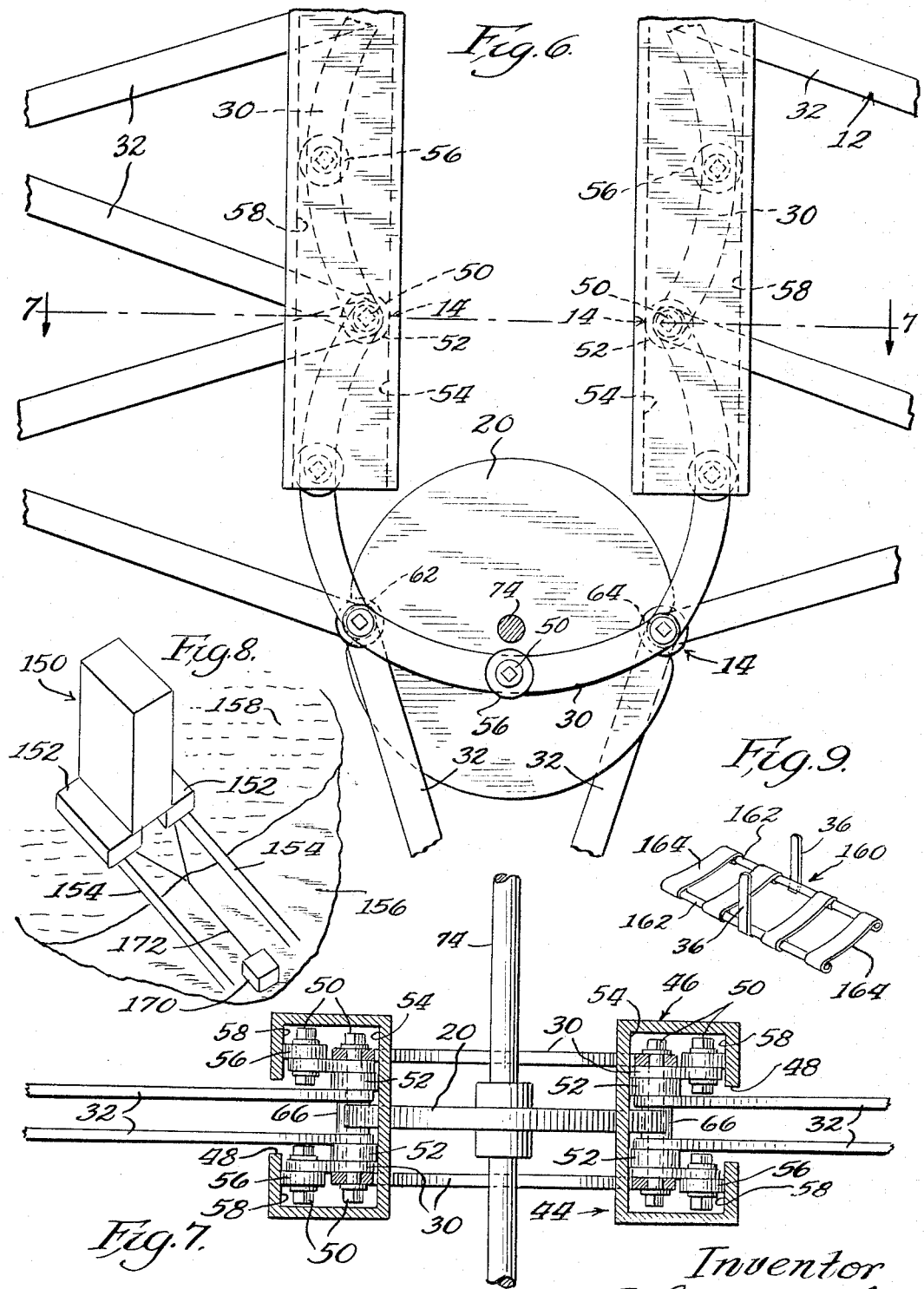

3,278,052
VEHICLE PARKING ARRANGEMENT
Robert D. Lichti, Long Beach, Calif., assignor of twenty-three percent to Walter A. Webster, Albuquerque, N. Mex., twenty-three percent to Harold Goble, Denver, Colo., and twenty-three percent to Robert F. Campbell, Placentia, Calif.
Filed Aug. 28, 1964, Ser. No. 392,833
5 Claims. (Cl. 214—16.1)

My invention relates to a vehicle parking arrangement, and more particularly, to a vehicle parking arrangement that is adapted to provide capsulized vehicle storage units of uniform size and operating characteristics to supply the present-insatiable demand for parking facilities.

Conventional vehicle parking arrangements call for the construction of large buildings and complex handling equipment to enable an installation to handle as many vehicles, such as autos, as might possibly be stored in the area utilized. Examples are the multi-story buildings found in urban centers, and it is obvious that such structures require a tremendous capital investment as well as a large work force to operate and maintain them.

In spite of the number and size of such vehicle accommodations, the vehicle parking situation in urban centers remains critical. It is well-known that any business nowdays must give consideration to parking facilities in making plans to insure the maximum freedom of customers and/or employee access to the place of business, and few businesses can afford the conventional multi-story parking facilities to solve this problem.

A principal object of my invention is to provide a simplified capsulized vehicle parking arrangement that holds a maximum number of vehicles for the space occupied, and yet is within the means of most business establishments.

Another principal object of the invention is to provide a vehicle parking arrangement that is adaptable to mass production and pre-fabrication techniques for providing modern capacity installations on a mass basis.

Still another principal object of the invention is to provide a basic vehicle storage arrangement that is readily adapted for installation as automobile parking facilities, and as pleasure craft storing facilities at boat marinas.

Other objects of the invention are to provide a vehicle storage arrangement that makes maximum use of the ground space available, to provide a vehicle storage arrangement that has a ground space requirement which does not greatly exceed the width of the vehicle parked end to end, and to provide a vehicle storage arrangement that is inexpensive of manufacture, convenient to install and use, and readily adapted for use in connection with a wide variety of land, water and air vehicles.

Still other objects, uses and advantages of the invention will be obvious or become apparent from a consideration of the following detailed description and application drawings.

In the drawings:

FIGURE 1 is a diagrammatic side-elevational view illustrating a principal feature of one embodiment of the invention;

FIGURE 2 is a diagrammatic perspective view of the arrangement shown in FIGURE 1, parts being broken away and omitted to better bring out other parts of the arrangement;

FIGURE 3 is a fragmental diagrammatic perspective view taken at the base of the vehicle loading arrangement showing the details of one of the vehicle loading platforms and some of the other operating aspects in accordance with the invention;

FIGURE 4 is a small scale diagrammatic plan view illustrating a multiple unit parking lot arrangement in accordance with the present invention;

FIGURE 5 is a view similar to that of FIGURE 1, but illustrating a modified form of the invention;

FIGURE 6 is a fragmental plan view on an enlarged scale of one of the pulley members of the present arrangement and the relation thereto of the associated conveyor member;

FIGURE 7 is a fragmental cross-sectional view taken substantially on the line 7—7 of FIGURES 1 and 6;

FIGURE 8 is a perspective view, in small scale and large hand block diagram form, illustrating a modified form of the invention arranged for handling watercraft; and FIGURE 9 is a fragmental perspective view illustrating a sling structure that is used in connection with the arrangement of FIGURE 8.

However, it should be understood that the drawing illustrations provided are supplied primarily to comply with the requirements of 35 U.S.C. 112, and the invention may take a wide variety of other embodiments.

Reference numeral 10 of FIGURES 1 and 2 generally indicates a specific embodiment of my invention, which broadly speaking, generally comprises a plurality of vehicle support platforms 11 supported between a pair of endless conveyor assemblies 13, supported by a pair of frame assemblies 15 mounted in any suitable manner on an appropriate base structure 17.

The conveyor assemblies 13 each comprise a plurality of cantilever members 12 pivotally connected together as at 14 to form endless conveying members 16 that are each trained about end pulleys 18 and 20, which are journalled in suitable cross members 22 and 24, respectively, of the respective frame members 15.

The cantilever members 12 each comprise a base link 30 and a pair of outwardly extending links 32 which are joined together at their outer ends by a suitable pin 34.

As indicated in FIGURE 2, the cantilever members 12 of the respective conveyor assemblies 13 are arranged or aligned in pairs and the respective pairs of cantilever members each support an individual vehicle support platform 11 through hanger arms that are in turn secured to the respective cantilever members by the pins 34. Arms 36 are fixed to the respective platforms 11 in any suitable manner.

The respective conveyor assemblies 13 are each arranged to define vertical runs 40 and 42 that extend between the respective pulleys 18 and 20, and as indicated in the drawings, the vertical conveyor runs operate in guide structures 44 of the general type shown in detail in FIGURE 7.

Guide structures 44 comprise tubular members 46 that are slotted as at 48 to accommodate the links 32 of the individual cantilever members 12.

As indicated in FIGURE 6, the pivotal connections between links 30 at 14 comprise pins 50 which also make the links 32 fast to the respective links 30 and journal rollers 52 (see FIGURE 7) which ride against track surfaces 54 that are defined by the respective guide members 44.

In the form shown, the links 30 are arcuate and journal rollers 56 which ride against the respective track surfaces 58 defined by the guide members 44.

The respective guide members 44 may be secured in place in any suitable manner as by cross braces 60 all connecting same with frame assemblies 15.

As indicated in FIGURES 1 and 6, the respective pulley members 18 and 20 are each provided with a pair of diametrically opposed notches 62 and 64, which, as the respective endless assemblies 13 move about the pulleys, engage pins 50 at their midportions 66 (see FIGURE 7) to guide the respective cantilever about the respective pulleys. One of the pulleys 18 or 20 may be driven, as for instance, a pulley 20, in which case the pulley 18 would be the tail or end pulley of the system. Pulley 20 may be driven in any suitable manner, such as by a power unit 70 through suitable gearing and the like that in the form illustrated operates a chain drive 71 engaging a sprocket 72 that is in turn keyed to a common shaft 74 of the pulleys 20 of the respective endless assemblies 13 (with the pulleys 18 being keyed to the shaft 74 in a suitable manner.

The shaft 74 of the pulleys 20 is journalled in any suitable manner in the respective frame members 22 while the tail pulleys 18 are keyed to a shaft 76 that is journalled in the frame cross members 24, again in any suitable manner).

Referring to FIGURE 3, a specific form of one of the vehicle support platforms 11 is shown at 11A, it being understood that all of the vehicle support platforms 11 will be arranged along the lines of a vehicle platform 11A. Vehicle platform 11A comprises a pallet 80 having rounded ends 82 and carrying spaced frame members 84, 86 and 88 that define ways 90 to receive the wheels of automotive vehicles. Two of the frame members 86 and 88 are formed with perforations or openings 92 that are aligned transversely of the pallet to receive latch pins 94 that are to be applied behind the wheels of the vehicle.

In the form of the invention shown in FIGURES 1-4, the frame assemblies 15 at their lower ends define a driveway 100 through which vehicles move to load upon the respective vehicle support platforms, and unload from same. In this particular form of the invention, the vehicle support platform to be loaded or unloaded is disposed adjacent to or rests on the surface 102 of the driveway so that the vehicle can be driven directly onto or off of the respective platforms.

Also associated with the apparatus 10 in the area of a driveway 100 are gate structures 104 and 106 for controlling traffic to and off of the platform 11 to be loaded or unloaded. Positioned adjacent and at one side of the driveway 100 at the position which the forward end of the platform 11 to be loaded or unloaded will take at its lowermost positon are three position indicator devices 106, 108 and 110, which serve the purpose of properly locating the position of the car on the pallet, depending on the size of the car.

In use, power apparatus 70 is actuated to turn pulleys 20 that move conveyor assemblies 13 about their endless paths to and in turn move the vehicle support members or platforms 11 about the path that is defined by the interconnecting of the cantilever members 32. It is intended that the power means 70 be reversable in nature so that conveyor assemblies 13 may move clockwise or counterclockwise as the need may require.

In the arrangement of FIGURE 1, a vehicle support platform 11 is positioned at the lowermost position to receive and discharge vehicles.

Assuming that the lowermost platform 11 is empty, and a driver approaches to park his car in arrangement 10, the operator standing at position 112 moves a lever 114 to swing gate 104 to a horizontal position so that the vehicle can drive up on the platform 11. Of course, the lock pins 94 are withdrawn for this operation. If the vehicle being driven is a small sports car, the operator has the vehicle driver stop the front end of his car in alignment with the indicator 106, while if the vehicle is a medium-sized vehicle, the vehicle is to be stopped with its front end in alignment with the indicator 108; if the vehicle is a larger type car, its front end is to be stopped in alignment with the indicator 110.

After the vehicle is moved over the operating area of gate 104 (which in its retracted position lies in recess 115), the parking arrangement operator re-positions the gate to its up position to keep further traffic out. When the vehicle is appropriately positioned on the platform 11, the operator applies the pins 94 at the nearest perforations 92 in front of the front tires and at the rear of the rear tires of the wheels on the side of the platform 11 adjacent him, whereupon, after the driver leaves his vehicle, the conveyor assemblies may be operated to lift the platform 11 either clockwise or counterclockwise to position the next platform to be loaded or unloaded at the lowermost position of the arrangement.

Assuming the vehicle carried by a particular platform 11 is to be unloaded, the operator of the car parking arrangement operates the drive assembly 70 until the platform 11 in question is in position at its lowermost position, after which the driver of the vehicle enters, starts his engine, and after the pins 94 are withdrawn, starts to drive his vehicle off the platform 11. Access outwardly of the driveway 104 is permitted by the arrangement operator moving the gate assembly 106 appropriately to swing it to its horizontal inoperative position (in which it lies in recess 117), and after the car being discharged is driven away, gate assembly is raised.

It will therefore be seen that the arrangement 10 comprises a capsulized vehicle parking arrangement in which the platforms of each arrangement are arranged in a pair of vertical stacks that are in effect connected together to form a continuous and endless conveyor assemblage.

As indicated in FIGURES 1 and 2, the entire structure is substantially vertically disposed and occupies ground space that does not greatly exceed the usual size of two standard motor vehicles parked end to end.

It is contemplated that individual arrangements 10 may be installed by small businesses, such as grocery stores and the like, adjacent their facilities to provide parking space for their customers. Customers, on parking, would be given tickets identifying the platform on which they parked their car, and on returning to the parking arrangement 10, would present the ticket to the operator, who would then position the car for driving away by the vehicle owner. I also contemplate that the arrangement 10 could be constructed to operate entirely automatically under the control of the individual vehicle drivers operating a push button system of an appropriate nature.

Alternatively, a parking lot arrangement of the general type indicated at 120 in FIGURE 4 may be employed, in which a plurality of arrangements or units 10 are constructed in a side-by-side relationship in banks or rows 122, 124 and 126. The units 10 of arrangement 120 should be positioned with respect to each other so that their entrances are from the directions indicated by arrows 128 and their exists are in the direction indicated by arrows 130.

A significant advantage of the individual arrangements 10 is that each unit has only one-way loading and one-way unloading; in other words, the vehicle moves in the same direction for both loading and unloading. And, furthermore, the vehicles are stacked vertically, rather than horizontally, which takes advantage of vertical air space rather than valuable ground area.

In the modification shown in FIGURE 5, the arrangement 130 is substantially the same as that shown in FIGURE 1 and includes identical parts, as indicated by corresponding reference numerals. However, in this arrangement, the lower portion of the conveyor assemblages 13A operate in a basement area or excavation 132 which permits the addition of several additional flights of platforms 11 on the assemblages 13A. In the form shown in FIGURE 5, the number of flights employed is increased by two over that shown in FIGURE 1, but the driveway 102A is positioned at a level in which two of the intermediate platforms 11 are horizontally aligned, a suitable connecting platform 134 being provided intermediate the guide structure 44 to permit the automotive vehicle to pass between aligned platforms 11.

In the embodiment of FIGURE 5, the frame assemblies 15A may be substantially the same as frame assemblies 15, although suitably modified to be complementary to the basement area 132. Also, the vehicle parking position indicators are positioned adjacent the loading position of platforms 11 alongside driveway 102A.

Entering vehicles load on the individual platforms 11 when they are positioned at the left-hand side of FIGURE 5 at the elevation of the driveway 102A, and the individual vehicles unload when the individual platforms 11 are positioned in alignment with the driveway 102A at the right-hand side of FIGURE 5.

Obviously, the basement area 132 may be as deep as desired to add as many additional flights of platforms as desired into the arrangement 130 between the respective pulleys 18 and 20.

FIGURES 8 and 9 show a modified form of the invention adapted for use in housing watercraft.

Reference numeral 150 of FIGURE 8 indicates a single parking arrangment 10 in block diagram form which is mounted on spaced support structures 152 having suitable wheels riding on spaced rails 154. Rails 154 extend from a beach land area 156 into a lake 158 in which the watercraft to be stored are used. In the arrangement 150, the vehicle support platforms 11 are eliminated in favor of the boat sling structures 160 indicated in FIGURE 9, each of which may comprise a pair of spaced longitudinally extending members 162, secured to the suspension members or hanger arms 36, and secured between the members 162 are sling-forming fabric strips 164 of canvas or the like in which the craft in question are disposed.

The arrangement of 150 may be lowered into the lake 158 by a power winch 170 having a cable 172 appropriately connected to the support structures 152. The arrangement 150 should be lowered into the water far enough so that when the respective sling arrangements 160 are in their lowermost positions, they are immersed sufficiently in the water to receive pleasure craft.

When the apparatus 150 is not in use, it may be drawn up on shore by operating a winch device 170 to pull it out of the water.

It will therefore be seen that I have provided a novel capsulized vehicle parking arrangement that lends itself readily to prefabrication and mass production techniques. Furthermore, the parts involved are few in number and simplified in nature so that installation is quick and inexpensive.

Also, this arrangement permits maximum use of a ground space that may be available for parking of a maximum number of vehicles.

The space required for a single parking arrangement 10 is on the order of 10 feet wide by 50 feet long and in the form shown in FIGURE 1, it can handle fifteen vehicles. Five more can readily be added by going to the arrangement of FIGURE 5 which permits the addition of four more vehicle support platforms to the system, or additional pairs of platforms, depending upon the depth gone to underground.

In the arrangements shown in FIGURE 4, an area of 80 feet by 185 feet, if employing arrangements 10 arranged in the manner indicated in FIGURE 1, will provide a total of 360 vehicle parking spaces.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A vehicle parking arrangement comprising:
an upright frame,
head and tail pulleys of substantially equal diameters journalled in said frame one above the other with their axes of rotation being substantially aligned in a vertical plane,
diametrically opposed means on said pulleys adapted to engage an endless conveyor,
an endless conveyor member trained over said pulleys to define a pair of vertically disposed runs extending between said pulleys and comprising a plurality of cantilever members secured together in spaced relation to define said endless member,
said cantilever members each including at the inner ends thereof a rigid arcuate shaped base member with rollers at opposite end and at the center portion thereof, said base member having an effective length equivalent to the diameters of said pulleys,
with adjacent ends of said cantilever member bases being secured together to define said conveyor member about the length of said conveyor member,
a vehicle support member suspended from the outwardly projecting ends of each of said cantilever members,
and means for reversibly driving said conveyor in forward and reverse directions.

2. The parking arrangement set forth in claim 1 wherein:
said frame beneath the lower of said pulleys defines a vehicle driveway,
with said support members being conveyed through said driveway on movement of said conveyor member,
said cantilever members each being proportioned to dispose the respective support members in vehicle receiving and discharge relation with said driveway when positioned in substantial vertical alignment with said pulleys.

3. The parking arrangement set forth in claim 2 including:
stop indicator means for guiding vehicle operators in controlling positioning a vehicle on the respective support members.

4. The parking arrangement set forth in claim 1 wherein:
said frame intermediate said pulleys defines a vehicle driveway extending parallel to the plane of movement of said conveyor member,
said cantilever members positioning said support members in relation to said driveway such that a support member on either run of the conveyor will be disposed level with said driveway when one of same is positioned level with said driveway.

5. The parking arrangement set forth in claim 1 wherein:
said frame is positioned adjacent a body of water,
and including means for moving said frame from a vehicle stowing position above said water body to a position in which the respective vehicle support members are in vehicle receiving and discharging relation with said body of water,
said vehicle support members comprising boat sling means for supporting watercraft.

References Cited by the Examiner

UNITED STATES PATENTS

| | | | |
|---|---|---|---|
| 1,882,656 | 10/1932 | Creedon | 214—16.1 |
| 1,906,827 | 5/1933 | Sumi et al. | 214—16.1 |
| 2,773,609 | 12/1956 | Holappa | 214—16.1 |
| 3,033,390 | 5/1962 | Gronvold | 214—16.1 |

FOREIGN PATENTS

| | | |
|---|---|---|
| 412,319 | 6/1934 | Great Britain. |
| 501,331 | 11/1954 | Italy. |
| 74,620 | 2/1949 | Norway. |

GERALD M. FORLENZA, *Primary Examiner.*

R. B. JOHNSON, *Assistant Examiner.*